United States Patent [19]

Kaneko et al.

[11] Patent Number: 5,114,881
[45] Date of Patent: May 19, 1992

[54] PROCESS FOR PRODUCING A CERAMIC PREFORM

[75] Inventors: Tsugio Kaneko; Tsuneo Kimura; Michihiro Ikeda; Akira Utsunomiya; Yuka Ohno, all of Kitakyushu, Japan

[73] Assignee: Mitsubishi Kasei Corporation, Tokyo, Japan

[21] Appl. No.: 684,501

[22] Filed: Apr. 15, 1991

Related U.S. Application Data

[63] Continuation of Ser. No. 314,887, Feb. 24, 1989, abandoned.

[30] Foreign Application Priority Data

Mar. 4, 1988 [JP] Japan ............................... 1-50838
Feb. 2, 1989 [JP] Japan ............................... 2-24538

[51] Int. Cl.$^5$ .............................................. C03C 3/06
[52] U.S. Cl. ............................................. 501/12; 501/54; 65/18.1; 65/18.3
[58] Field of Search ............... 501/12, 54; 65/17, 18.1, 65/18.3

[56] References Cited

U.S. PATENT DOCUMENTS

| | | | |
|---|---|---|---|
| 4,680,049 | 7/1987 | Onorato et al. | 65/18.1 |
| 4,681,615 | 2/1987 | Toki et al. | 65/18.1 |
| 4,747,863 | 5/1988 | Clasen et al. | 501/12 X |
| 4,801,318 | 1/1989 | Toki et al. | 501/12 X |
| 4,806,328 | 2/1989 | Van Lierop et al. | 501/12 X |
| 4,883,521 | 11/1989 | Shimizu et al. | 501/12 X |
| 4,943,542 | 7/1990 | Hayashi et al. | 501/12 |

FOREIGN PATENT DOCUMENTS

| | | | |
|---|---|---|---|
| 60-65735 | 4/1985 | Japan . | |
| 0168542 | 7/1986 | Japan . | |
| 62-46950 | 2/1987 | Japan . | |
| 62-100421 | 5/1987 | Japan . | |
| 3112434 | 5/1988 | Japan | 65/18.1 |

Primary Examiner—Karl Group
Attorney, Agent, or Firm—Oblon, Spivak, McClelland, Maier & Neustadt

[57] ABSTRACT

A process for producing a ceramic preform, which comprises mixing an alkoxysilane and fine silica powder, molding the mixture, followed by heating for dealcoholysis.

25 Claims, No Drawings

PROCESS FOR PRODUCING A CERAMIC PREFORM

This application is a continuation of application Ser. No. 07/314,887, filed on Feb. 24, 1989, now abandoned.

The present invention relates to a process for producing a ceramic preform. More particularly, it relates to a process for producing a ceramic preform which is free from fracture or cracking and which can be sintered to obtain a sintered product having a low water content.

Heretofore, for the production of ceramic shaped products, a so-called sol-gel method wherein a sol obtainable by hydrolyzing a metal alkoxide such as alkoxysilane by an addition of water, is gelled and dried to obtain a dry gel i.e. a ceramic preform, which is then sintered to obtain a sintered ceramic product. However, in this method, water is used in an amount several times the theoretical amount for the hydrolysis, or an alcohol is used as the solvent. Therefore, the gel contains substantial amounts of water and the alcohol, and it takes a long time of from 0.5 to 2 months for drying the gel. Yet, as the volume reduces, fracture or cracking is likely to take place. For the purpose of preventing such fracture or cracking, it has been proposed to incorporate fine silica powder in an amount of from 0.2 to 5 mol times to the metal alkoxide. However, even by this method, when the gel to be dried is left to stand at room temperature, the surface drying takes place rapidly, whereby it has been difficult to adequately prevent fracture or cracking. Therefore, it used to be required to put a cover having a relatively small opening on the container and gradually dry the gel. (Japanese Unexamined Patent Publication No. 131833/1975)

According to the conventional technique for producing a sintered product such as quartz glass by the sol-gel method, the reduction of the water content (the OH group content) in the quartz glass used to be about 1,000 ppm at best, and it has been difficult to reduce the water content to a level of molten natural quartz, i.e. to a water content of 300 ppm.

Japanese Unexamined Patent Publication No. 68542/1986 discloses a process for producing quartz glass by a sol-gel method using an alkylsilicate and super fine silica powder as starting materials, wherein a dry gel is held within a temperature range of from 900 to 1,300° C. for at least 20 hours to reduce the water content in quartz glass. However, even by this method, in order to reduce the water content in quartz glass to a level of not more than 300 ppm, it is required to continue the heating within the above temperature range for at least 80 hours. Thus, this method involves many practical problems for industrial operation.

It is an object of the present invention to provide a process for producing a ceramic preform having excellent quality, particularly a ceramic preform free from fracture or cracking and capable of being sintered to form a sintered product having a low water content.

The present inventors have accomplished this object by mixing an alkoxysilane and fine silica powder, molding the mixture, followed by heating for de-alcoholysis.

In the broadest sense, the present invention provides a process for producing a ceramic preform, which comprises mixing an alkoxysilane and fine silica powder, molding the mixture, followed by heating for de-alcoholysis.

The alkoxy group in the alkoxysilane as the starting material of the present invention is preferably an alkoxy group having from 1 to 4 carbon atoms such as a methoxy group, an ethoxy group, a propoxy group and butoxy group. Among them, a methoxy group and an ethoxy group are particularly preferred. The alkoxysilane preferably contains at least two such alkoxy groups.

Specifically, the alkoxysilane includes tetramethoxysilane, trimethoxychlorosilane, dimethoxydimethylsilane, tetraethoxysilane, tetrapropoxysilane and tetrabutoxysilane.

Further, an oligomer (such as each of dimer to decamer) of an alkoxysilane, obtainable by partial hydrolysis and poly-condensation of the above-mentioned alkoxysilane may be mentioned. Such an oligomer of an alkoxysilane is industrially suitable in view of the transportation and storage stability, the handling efficiency and the cost effectiveness.

In the case of an alkoxysilane which has a relatively high vapor pressure and which is likely to evaporate and disperse during the subsequent heating for de-alcoholysis, it is preferred to use its oligomer having a low vapor pressure, as the starting material. Among the above-mentioned various alkoxysilanes, particularly preferred is an alkoxysilane or its oligomer of the formula:

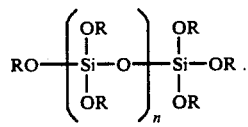

wherein n is an integer of from 0 to 9 and R is an alkyl group. R is preferably an alkyl group having from 1 to 4 carbon atoms, more preferably a methyl group or an ethyl group.

The fine silica powder may be produced, for instance, by a method wherein a hydroxide prepared by hydrolyzing a silicon compound in a wet system, is sintered, or by a method wherein a silicon halide or an alkoxysilane is hydrolyzed in a dry system or burned. In the case of a dry system, it is possible to obtain fine silica powder having adsorbed water remarkably reduced.

As will be described hereinafter, it is believed that in the present invention, a reaction of the fine silica powder and the alkoxysilane i.e. a reaction of the hydroxyl groups of the fine silica powder with the alkoxysilane, is utilized. Therefore, the fine silica powder is required to have hydroxyl groups on its surface. Depending upon the process for its preparation, fine silica powder may have an extremely small density of surface hydroxyl groups. However, for the purpose of the present invention, the surface hydroxyl group density obtainable by the contact with air after the production, may be sufficient. Therefore, there is no particular restriction as to the method for the preparation of fine silica powder to be used in the present invention.

The fine silica powder to be used in the present invention usually has a hydroxyl group density of from 0.1 to 8 groups/100 Å$^2$, preferably from 0.2 to 4 groups/100 Å$^2$.

The fine silica powder preferably has a particle size of from 5 to 1,000 m$\mu$m, more preferably from 10 to 500 m$\mu$m. If the particle size is too small, deaeration during the molding tends to be inadequate, whereby it tends to be difficult to obtain a highly dense preform, or cracking tends to take place during the after-mentioned step for de-alcoholysis. On the other hand, if the particle size is too large, it requires a high sintering temperature when the preform is sintered to obtain a sintered product, such being disadvantageous from the viewpoint of energy consumption. There is an additional drawback that it is thereby difficult to obtain a transparent sintered product.

The fine silica powder is used preferably in an amount of from 0.2 to 50 parts by weight, more preferably from 0.5 to 20 parts by weight, per part by weight of the alkoxysilane. If the amount is too small, the strength of the preform tends to be low, and the amount of the alcohol generated during the step for de-alcoholysis tends to be large, whereby fracture or cracking is likely to take place. On the other hand, if the amount is too large, it tends to be difficult to obtain a dense sintered product.

There is no particular restriction as to the method for mixing the alkoxysilane and the fine silica powder. They may be simply stirred and mixed, or a solvent may be used in a case where a material having a high viscosity such as an oligomer of an alkoxysilane, is used. Usually, it is preferred to stir and mix them in the presence of a solvent (or a dispersing medium).

As the solvent for this purpose, not only the same alcohol as the alcohol component of the above alkoxysilane, but also a lower alcohol such as methanol, ethanol, propanol or butanol, an ether and acetone or methyl ethyl ketone, or other inert organic solvents having a low boiling point, may be mentioned. The solvent is used usually in an amount of from 0.5 to 10 parts by weight, preferably from 1 to 5 parts by weight, per part by weight of the total amount of the alkoxysilane and the fine silica powder.

The solvent used here may optionally be evaporated after the mixing. Of course the solvent can be recovered and reused.

During the mixing, a binder such as polyvinyl alcohol, carboxymethyl cellulose or starch, a surfactant, a pH controlling agent, etc. may be added, as the case requires. At that time, a small amount of fine powder of an alkoxide or an oxide of a metal in Groups III to V of the Periodic Table, such as Al, B, Ti, P, Ge, Zr, Sb, Y or rare earth metals, may also be added.

The mixture of the alkoxysilane and the fine silica powder thus obtained, is molded in a dry state or in a wet state where the solvent or the like remains to some extent. In such a mixture, the fine silica powder is mostly agglomerated in such a state that the alkoxysilane is deposited on its surface or it is dispersed in a liquid comprising the alkoxysilane and the solvent. It may some times form coarse agglomerates. Therefore, prior to the molding operation, it is preferred to adjust the particle size of the mixture to a level of at most 150 μm, preferably at most 100 μm, more preferably a most 50 μm, so that no agglomerates remain, whereby it is possible to prevent the turbidity or non-uniformity of the ceramic preform, and it is possible to obtain a uniform and highly dense ceramic preform.

The particle size may be adjusted by a method such as sieving by means of a sieve, or pulverization followed by sieving. As the sieve, any filter material having a desired mesh size may be employed such as a net, cloth or a sintered product made of various materials. However, in order to avoid inclusion of impurities, it is preferred to employ a filter material made of a synthetic resin. For the same reason, the pulverizer may preferably be made of a synthetic resin.

The agglomerates in the above mixture are usually in a loosely agglomerated state and can be pulverized during the sieving by means of such a sieve. Therefore, in many cases, the object can be attained simply by sieving. However, pulverization may be conducted as the case requires.

There is no particular restriction as to the method for molding. For example, the mixture may simply be filled in a predetermined container, or may be put into a mold and pressed. Otherwise, molding may be conducted by means of an extrusion molding machine or an injection molding machine. The shape of the molded product may be in the form of the final product or in the form of a shaped material for further processing, such as pellets, strands or sheets. Among these methods, mold pressing is preferred. In this case, pressing is conducted usually under a pressure of from 50 to 3,000 kg/cm$^2$, preferably from 100 to 2,000 kg/cm$^2$. If the pressing pressure is too low, voids tend to remain in the preform, or the shape is likely to change. On the other hand, even if the pressing pressure is high, there is no adverse effect to the preform. However, the pressing under a pressure of higher than 3,000 kg/cm$^2$ is not advantageous from the viewpoint of installation and operation.

If a product molded by such as pressing is further subjected to finish molding such as cold isotactic pressing (CIP), distortion due to the molding can be reduced to obtain a preform having a higher density.

The preform thus obtained is then heated for the de-alcoholysis reaction of the alkoxysilane with hydroxyl groups on the surface of the fine silica powder. The de-alcoholysis is conducted usually at a temperature of from 100° to 300° C., preferably from 120° to 250° C., for at least 10 minutes, usually at least 30 minutes. If the temperature is too low or the time is too short, the de-alcoholysis reaction of the alkoxysilane with hydroxyl groups on the surface of the fine silica powder does not proceed adequately, whereby the strength of the ceramic preform will be low. On the other hand, if the temperature is too high, decomposition or evaporation of the alkoxysilane tends to increase, whereby fracture or cracking tends to take place, such being undesirable.

In this de-alcoholysis, the volume change of the preform is small, and the resulting ceramic preform will be free from fracture and cracking.

The de-alcoholysis in the process of the present invention is considered to proceed as shown by the following scheme in the case where the alkoxysilane or its oligomer (dimer to decamer) and fine silica powder are used:

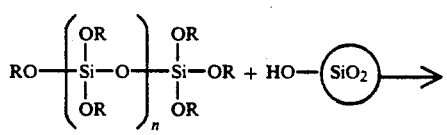

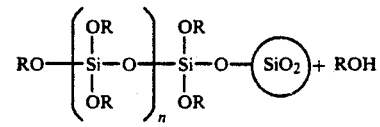

In the above formulas, n is an integer of from 0 to 9, R is an alkyl group, and (SiO$_2$) is SiO$_2$ particle.

HO—$\text{SiO}_2$ indicates that a OH group is attached on the surface of a $\text{SiO}_2$ particle, and for convenience sake, it is represented by a mono functional group.

Accordingly, if the de-alcoholysis adequately proceeds, the product is considered to be as follows:

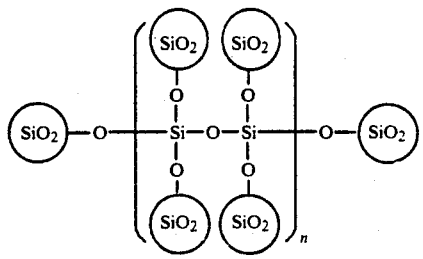

wherein n and $\text{SiO}_2$ are as defined above.

The ceramic preform thus prepared can be converted by sintering to glass or strong ceramics, which can be used as optical glass such as a lens, a prism or a photomask, as a belljar, a crucible, as a semiconductor product such as semiconductor jig, as quartz glass for science and chemistry or as a structural material used at a high temperature. Further, the ceramic preform may be used by-itself without sintering for applications such as separation membranes, catalysts carriers, gas absorbents or heat shielding materials utilizing the porous nature.

The temperature for sintering the ceramic preform varies depending upon the content of the fine silica powder, the particle size, etc. However, it is usually at a level of from 800° to 1,900° C. For example, in a case where transparent quartz glass is to be prepared b using an alkoxysilane and fine silica powder as the starting materials, the temperature is preferably from 1,000° to 1,300° C.

For the purpose of comparison with the present invention, the assumed reaction scheme of the reaction by the above-mentioned sol-gel method will be given below wherein alkoxysilane is employed.

Hydrolysis $$\text{Si(OR)}_4 + 4\text{H}_2\text{O} \rightarrow \text{Si(OH)}_4 + 4\text{ROH}$$

Dehydration condensation reaction
$$X\text{Si(OH)}_4 \rightarrow (\text{SiO}_2)_X + 2X\text{H}_2\text{O}$$

The process of the present invention does not require the presence of water, whereby a ceramic preform having excellent quality is believed to be obtainable.

The presence of a large amount of water means that the preform and the sintered product thereof will contain water. Accordingly, fracture or cracking will thereby be caused, and the de-alcoholysis will thereby be hindered in the subsequent de-alcoholysis step, whereby the strength of the preform is likely to be low.

However, according to the process of the present invention, the presence of water can be reduced, and it is thereby possible to avoid the above mentioned problems inherent to use of a large amount of water as in the sol-gel method. The present invention does not require an absolute anhydrous state. An alcohol used as the solvent, such as an alcohol for industrial purposes, usually contains water in an amount of a few hundreds ppm, and air o the starting materials have deposited water. In the present invention, the presence of water of this degree is permissible. The alkoxysilane has low compatibility with water, and water in an amount of about 1 mol per mol of the alkoxysilane, will be consumed by the conversion of the alkoxysilane to its oligomer, whereby the presence of water is reduced. Further, as mentioned above, the amount of water adsorbed on the fine silica powder varies depending upon the method for the preparation of silica powder or on the state of contact with air after the preparation, and such may affect the formation of OH groups on the surface of the fine silica powder. Accordingly, it is preferred that water adsorbed on the fine silica powder is controlled to be not more than 1 mol%, more preferably not more than 0.1 mol%, relative to the fine silica powder.

The ceramic preform obtained by the present invention can be converted by sintering to quartz glass having a low water content at a level of not higher than a few hundreds ppm and having excellent heat stability and transparency retaining properties.

Now, the present invention will be described in further detail with reference to Examples. However, it should be understood that the present invention is by no means restricted by such specific Examples.

EXAMPLE 1

100 g of commercially available fumed silica (Aerosil OX 50, tradename, manufactured by Degussa, Fed. Rep. of Germany) was added to 500 g of methanol (guaranteed reagent) and dispersed uniformly in the methanol by mixing with a stirrer. Further, 18.2 g of methyl silicate (methoxysilane oligomer containing $\text{SiO}_2$ at a concentration of 51%) was added thereto, and the mixture was thoroughly stirred and mixed. Then, the methanol solvent was evaporated from the mixture by an evaporator to obtain a non-sticky powder mixture (Mixture I).

Mixture I was passed through a nylon net having a mesh size of 50 μm to remove coarse agglomerate particles larger than the mesh size of the net. The mixture after the removal of coarse particles, was charged into a SUS 304 press container having a square cross sectional shape with each side being 55 mm and press-molded under a pressure of 150 kg/cm²G. Further, a pressure of 2,000 kg/cm²G was exerted by cold isotactic pressing to obtain a molded product of a sheet shape of 52.7 mm × 52.7 mm × 6.5 mm. This molded product was placed in a drier and subjected to de-alcoholysis at 200° C. for 4 hours. As a result, the weight of the obtained ceramic preform was 23.5 g, and no dimensional change or no cracking was observed. Then, the ceramic preform was introduced into an electric furnace, heated to 1,250° C. at a temperature raising rate of 50° C./hr and maintained at that temperature for 5 hours to obtain a transparent quartz glass having a size of 43.5 mm × 43.5 mm × 5.4 mm and a weight of 22.6 g (density: 2.2 g/cc) and having no turbidity. The water content (OH groups) in this quartz glass was measured by the infrared spectrum and found to be 300 ppm.

Then, the same operation as above was conducted except that as the nylon net, one having a mesh size of 70 μm or 100 μm was used. As a result, in each case, the quartz glass obtained was a transparent quartz glass having no turbidity. The water content (OH groups) in each quartz glass was measured by the infrared spectrum and found to be 300 ppm in each case.

Further, the same operation as above was conducted except that as the nylon net, one having a mesh size of at least 300 μm was used for the removal of coarse agglomerate particles, or the operation for the removal of coarse particles was omitted. As a result, in each case, a transparent quartz glass having a size of 43.5 mm×43.5 mm×5.4 mm and a weight of 22.6 g (density: 2.2/cc) was obtained although three or fifteen white turbid points of a size of from 0.1 to 1 mm were observed in it. The water content (OH groups) in each quartz glass was measured by the infrared spectrum and found to be 300 ppm in each case.

EXAMPLE 2

18.2 g of methyl silicate (methoxysilane oligomer containing $SiO_2$ at a concentration of 51%) and 250 g of methanol (guaranteed reagent) were mixed. To this liquid mixture, 100 g of fumed silica (Aerosil OX 50, tradename, manufactured by Degussa, Fed. Rep. of Germany) was added and dispersed uniformly by mixing with a stirrer.

The mixture was heated under reduced pressure (30–60 Torr) at 40° C. by means of an evaporator to evaporate the methanol solvent. As a result, a non sticky powder mixture was obtained.

24.9 g of this mixture was charged into a SUS 304 press container having a square cross sectional shape with each side being 55 mm and press-molded under a pressure of 100 kg/cm2G. Further, a pressure of 1,500 kg/cm2G was exerted by cold isotactic pressing to obtain a molded product of a sheet shape of 53. 2 mm×53.2 mm×6.6 mm. This molded product was put in a drier and subjected to de-alcoholysis at 150° C. for 6 hours. The weight of the ceramic preform thus obtained was 23.5 g, and no dimensional change or no cracking was observed.

Then, this ceramic preform was introduced into an electric furnace and heated to 1,250° C. at a temperature raising rate of 50° C./hr and held at that temperature for 6 hours to obtain a transparent quartz glass having a size of 43.5 mm×43.5 mm×5.4 mm and a weight of 22.63 g (density: 2.2 g/cc) although 10 white turbid points of a size of from 0.1 to 1 mm were observed in the glass.

The water content (OH groups) in the quartz glass was measured by the infrared spectrum and found to be 300 ppm.

EXAMPLE 3

36.7 g of methyl silicate (methoxysilane oligomer containing $SiO_2$ at a concentration of 51%) and 500 g of methanol (guaranteed reagent) were mixed. To this liquid mixture, 100 g of fumed silica (Aerosil #200, tradename, Nippon Aerosil Company Limited) was added and dispersed uniformly by mixing with a stirrer.

This mixture was heated to 60° C. under stirring to evaporate the methanol solvent. As a result, a nonsticky dry powder mixture was obtained. 16.40 g of this mixture was charged into a SUS 304 press container having a square cross sectional shape with each side being 55 mm and press-molded under a pressure 130 kg/cm2G Further, a pressure of 2,000 kg/cm2G was exerted by cold isotactic pressing to obtain a molded product of a sheet shape of 51 mm×51 mm×6.0 mm.

The molded product was introduced into an electric furnace and subjected to de-alcoholysis at 200° C. for 2 hours. Then, it was heated from 200° C. to 1,200° C. at a temperature raising rate of 50° C./hr and held at that temperature for 2 hours, to obtain a transparent quartz glass having a size of 35.8 mm×35.8 mm×5.0 mm and a weight of 14.09 g (density: 2.2 g/cc) although 15 white turbid points of a size of from 0.1 to 1 mm were observed in the glass. The water content (OH groups) in the quartz glass was measured by the infrared spectrum and found to be 300 ppm.

EXAMPLE 4

25.0 g of ethyl silicate (ethoxysilane oligomer containing SiO2 at a concentration of 40%) and 250 g of ethanol (guaranteed reagent) were mixed. To this liquid mixture, 100 g of fumed silica (Aerosil OX.50, tradename, manufactured by Degussa, Fed. Rep. of Germany) was added and dispersed uniformly by mixing with a stirrer. This mixture was heated to about 75° C. under stirring to evaporate the ethanol solvent. As a result, a non-sticky dry powder mixture was obtained. 30.0 g of this mixture was charged into a SUS 304 press container having a square cross sectional shape with each side being 55 mm and press molded under pressure of 130 kg/cm2G. Then, a pressure of 2,000 kg/cm2G was exerted by cold isotactic pressing to obtain a molded product of a sheet shape of 53 mm×53 mm×8.0 mm. The molded product was introduced into a drier and subjected to de-alcoholysis at 200° C. for 2 hours. As a result, the weight of the molded product was 27.9 g, and no dimensional change or no cracking was observed.

Then, the molded product was put in an electric furnace, heated to 1,250° C. at a temperature raising rate of 50° C./hr and held at that temperature for 6 hours to obtain a transparent quartz glass having a size of 43.1 mm×43.1 mm×6.5 mm and a weight of 26.6 g (density: 2.2 g/cc) although 13 white turbid points of a size of from 0.1 to 1 mm were observed in the glass. The water content (OH groups) in the quartz glass was measured by the infrared spectrum and found to be 300 ppm.

As is apparent from the Examples, according to the present invention, there is no problem of fracture or cracking due to the shrinkage of the gel during the drying operation, as compared with the conventional process for the preparation of a ceramic preform by a sol-gel method, and the drying step which used to be a controlling factor for the period required for the production, can be omitted. Yet, as opposed to the production of a ceramic preform by the conventional sol-gel method, no water is used during the process. Thus, it is possible to obtain a sintered ceramic product having a very small water content and excellent heat stability and transparency-retaining properties. Thus, the process of the present invention is very advantageous from the industrial point of view.

What is claimed is:

1. A process for producing a ceramic preform, which comprises mixing an alkoxysilane and fine silica powder without the addition of water, molding the mixture, and heating said mixture to effect de-alcoholysis by reaction of the alkoxysilane with hydroxyl groups on the surface of the fine silica powder.

2. The process according to claim 1, wherein the alkoxysilane is an alkoxysilane or its oligomer of the formula:

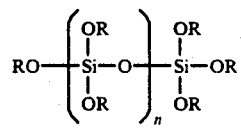

wherein n is an integer of from 0 to 9 and R is an alkyl group

3. The process according to claim 2, wherein R is an alkyl group having from 1 to 4 carbon atoms.

4. The process according to claim 2, wherein R is a methyl group or an ethyl group.

5. The process according to claim 1, wherein the fine silica powder has a surface silanol group density of from 0.1 to 8 groups/100 Å$^2$.

6. The process according to claim 1, wherein the fine silica powder has a particle size of from 5 to 1,000 m$\mu$m.

7. The process according to claim 1, wherein the fine silica powder has a deposited water content of not more than 1 mol%.

8. The process according to claim 1, wherein the fine silica powder is used in an amount of from 0.2 to 50 parts by weight per part by weight of the alkoxysilane.

9. The process according to claim 8, wherein the fine silica powder is used in an amount of from 0.5 to 20 parts by weight per part by weight of the alkoxysilane.

10. The process according to claim 1, wherein the alkoxysilane and the fine silica powder are mixed in the presence of a solvent.

11. The process according to claim 10, wherein the solvent is a lower alcohol or an ether.

12. The process according to claim 11, wherein the lower alcohol is an alcohol corresponding to the alkoxy group in the alkoxysilane used.

13. The process according to claim 10, wherein the solvent is used in an amount of from 0.5 to 10 parts by weight per part by weight of the total amount of the alkoxysilane and the fine silica powder.

14. The process according to claim 10, wherein the solvent is evaporated from the mixture prior to the molding of the mixture.

15. The process according to claim 1, wherein the mixture is adjusted to have a particle size of at most 150 $\mu$m prior to the molding.

16. The process according to claim 15, wherein a sieve and/or a pulverizer is used as a means for adjusting the particle size.

17. The process according to claim 16, wherein a sieve made of a synthetic resin and/or a pulverizer made of a synthetic resin is used.

18. The process according to claim 1, wherein the molding includes press molding.

19. The process according to claim 1, wherein the molding includes cold isostatic pressing.

20. The process according to claim 1, wherein the de-alcoholysis is conducted by heating at a temperature of from 100° to 300° C.

21. The process according to claim 20, wherein the de-alcoholysis is conducted at a temperature of from 120 to 250° C.

22. The process according to claim 10, wherein the solvent is an inert organic solvent having a low boiling point.

23. The process according to claim 1, further including sintering the ceramic preform.

24. The process according to claim 13, wherein the solvent is used in an amount of from 1-5 parts by weight per part by weight of the total amount of the alkoxy silane and the fine silica powder.

25. The process according to claim 23, wherein the ceramic preform is sintered at a temperature of from 1,000° to 1,300° C.

* * * * *